Oct. 21, 1924.

E. MICHEL

ROTARY CUTTING IMPLEMENT

Filed Oct. 23, 1922

1,512,296

Inventor
Edmond Michel

By Cushman Bryant & Darby
Attorneys

Patented Oct. 21, 1924.

1,512,296

UNITED STATES PATENT OFFICE.

EDMOND MICHEL, OF NEW ORLEANS, LOUISIANA, ASSIGNOR TO ELECTRIC HAND SAW COMPANY, INC., OF NEW ORLEANS, LOUISIANA, A CORPORATION.

ROTARY CUTTING IMPLEMENT.

Application filed October 23, 1922. Serial No. 596,359.

*To all whom it may concern:*

Be it known that I, EDMOND MICHEL, a citizen of the United States, residing at New Orleans, in the parish of Orleans and State of Louisiana, have invented new and useful Improvements in Rotary Cutting Implements, of which the following is a specification.

This invention relates to cutting implements of the rotary type.

Implements of this general type are old and well known, and as an example of such a device reference is had to the patent to Madere, 1,342,294, June 1, 1920, it being the object of the present invention to provide certain improvements upon the device disclosed in that patent.

The improvements to which the invention relates have to do with the provision of means for guiding the cutting element and for limiting the depth of the cut made thereby.

A further object of the invention is to simplify and to render more durable and compact the general structure of the implement.

Other objects of the invention will be emphasized as the description proceeds in connection with the illustrative embodiment of the invention disclosed in the accompanying drawings, wherein:—

Figure 1:
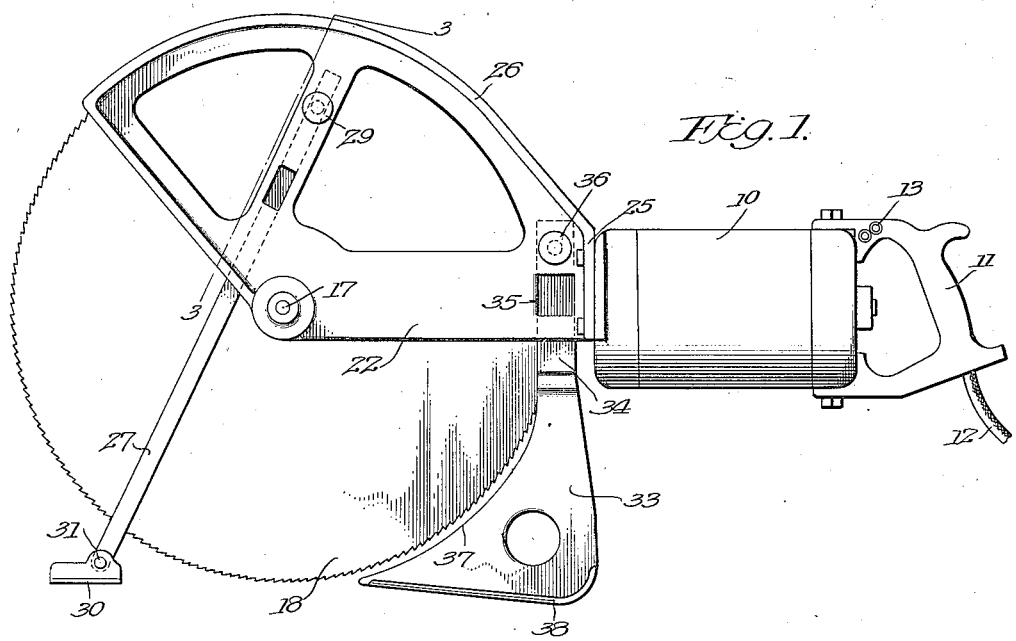
Fig. 1 is a side elevational view.

Referring to the drawings for a more detailed description, 10 indicates an electric motor having thereon a handle 11 through which extend the transmission wires 12 conducting power to the motor. The motor may be controlled by a switch 13 conveniently positioned upon the handle.

From the forward portion of the motor extends a housing 14 having a lateral opening 15 in which are bearings 16 for a shaft 17. Upon the shaft is fixedly mounted a rotary cutting element 18, such as a saw, and the shaft may be driven by means of gears 19, 20; the former being upon the shaft 17 and the latter upon the extremity of a shaft 21 projecting through the housing and operatively connected with the armature shaft of the motor. Upon the opposite side of the cutting element is a plate 22 having a bearing housing 23 formed therein for bearings 24 which surround the cutter shaft 17. The plate 22 is of substantially segmental contour and is flanged as at 25 where it is bolted or otherwise suitably secured to the motor housing. The upper edge 26 of the plate substantially coincides with the edge of the cutter so that the plate constitutes a guard.

Figure 3:
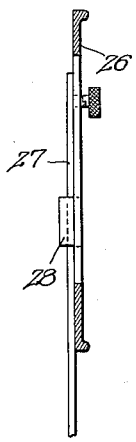
Fig. 3 is a section on the line 3—3 of Fig. 1.
Figure 4:
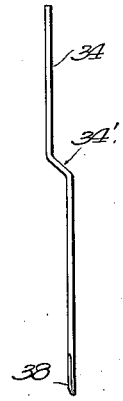
Fig. 4 is an edge view of the rear guide.

In order to guide the saw and to limit the depth of the kerf made thereby it is desirable to provide a rest or guide element positioned in advance of the cutter. For this purpose a guide arm 27 extends through an eye 28 (Fig. 3) which may be struck from the plate; the arm is clamped in position by means of a clamping screw 29 adapted to engage the portion of the arm above the eye whereby the arm may be adjusted vertically and relative to the edge of the cutter. The lower end of the arm has pivotally mounted thereon a foot 30 which may be adjusted and held in set position as by a clamp nut 31. Vertical adjustment of the arm will determine the depth of the cut and adjustment of the guide foot 30 will determine the angle at which the cutter is to be maintained during operation. When accuracy is not necessary the guide may be readily removed, but when employed it affords a rest immediately in front of the saw, and whenever cutting wood or similar material it will be found very useful in maintaining a uniform depth of cut.

In addition to the front guide it has been found desirable to provide a rear guide having a material engaging portion which, preferably, is positioned in the same horizontal plane with the cutter so that it may travel in the kerf formed thereby in order to prevent accidental lateral movement or wabbling of the cutter. The material engaging portion of the rear guide, which is that portion adjacent the lower edge of the same, is substantially on a line tangent with the circumference of the cutter, so that it readily fits into the kerf formed by the cutter and does not interfere with the operation of the latter. Such a guide is indicated by the reference character 33, the same having a shank 34 projecting between lugs 35 struck out from the guard; the guide is held in position by a clamping screw 36.

Figure 2:
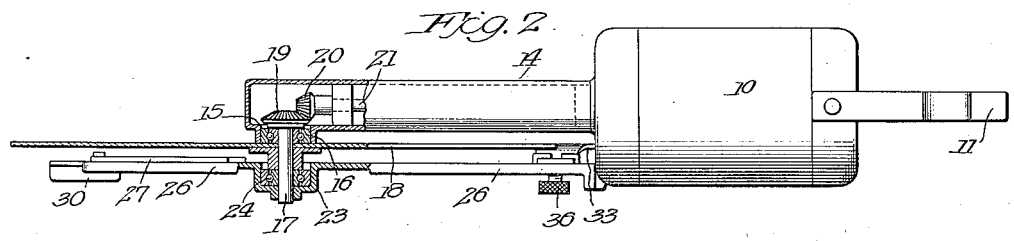
Fig. 2 is a top plan view with portions of the device shown in section.

It will be noted that the shank 34 is laterally deflected at 34' so that the lower or operative portion of the guide may be positioned in line with the cutter as indicated in Fig. 2.

The forward edge 37 of the rear guide is struck on a curve to conform to the edge of the cutter, and its lower edge 38 may be sharpened or knifed, if desired. In using the implement the lower edge of the guide 33 fits within the kerf or cut made by the cutting element and being of substantial length prevents wabbling of the cutter, which is a highly important function since the cutter element revolving at high speed can easily be broken by twisting of the material or by relative lateral movement between the cutter and material. Attention is called to the fact that the lower edge of the rear guide is positioned slightly below the cutter so that the guide will at all times be positioned in the kerf produced. The knifed lower edge of the guide will be found particularly useful in slaughter house work, as well as in connection with other special uses to which the implement may be readily put.

Both of the guides may be removed from the guard when necessary, or the latter may be detached quickly when the cutter is to be sharpened or replaced. Although the guides are shown as directly mounted upon the guard plate 22, obviously they could readily be secured to another portion of the implement without departing from the invention.

It should be understood that numerous modifications may be made in the details of construction without departing from the scope of the invention.

I claim:

1. A portable rotary cutting implement comprising a support, a rotary cutter journalled on said support, a motor mounted at the rear of said support, a shaft connected to the motor, gearing driven by said shaft for driving the cutter, a guide positioned in front of said cutter and adjustable with relation thereto, said guide being positioned to rest upon the surface to be cut, a second guide positioned at the rear of said cutter and having a material engaging portion positioned in the same plane with said cutter substantially on a line tangent with the circumference of the cutter and adapted to travel in the kerf formed thereby, whereby the guide may follow the path of said cutter.

2. A portable rotary cutting implement comprising a support, a rotary cutter journalled on said support, a motor mounted on said support, a shaft connected to the motor, gearing driven by said shaft for driving the cutter, a guide positioned in front of said cutter and adjustable with relation thereto, a pivotally adjustable foot on said guide positioned to rest upon the surface to be cut, a second guide positioned at the rear of said cutter and having a material engaging portion positioned in the same plane with said cutter and substantially on a line tangent with the circumference of the cutter, whereby the guide may follow the path of said cutter.

3. A portable rotary cutting implement comprising a support, a rotary cutter journalled on said support, a motor mounted on said support, a shaft connected to the motor, gearing driven by said shaft for driving the cutter, a guide positioned in front of said cutter and adjustable with relation thereto, said guide being positioned to rest upon the surface to be cut and thereby support the cutter, a second guide positioned at the rear of said cutter and having a material engaging portion positioned in the same plane with said cutter, whereby the guide may follow the path of said cutter, said second mentioned guide having a material engaging portion of substantial length on a line tangent with the circumference of the cutter and adapted to fit into the kerf formed thereby.

4. A portable rotary cutting implement, comprising a support, a rotary cutter journalled on said support, a motor mounted at the rear of said support, a shaft connected to the motor, gearing driven by said shaft for driving the cutter, a guide positioned in front of said cutter and adjustable with relation thereto, a second guide positioned at the rear of said cutter and having a material engaging portion positioned in the same plane with said cutter, whereby the guide may follow the path of said cutter, said second mentioned guide being adjustable with relation to the cutting edge of said cutter, and having a cutting edge adapted to travel in the kerf formed by said cutter.

5. A portable rotary cutting implement comprising a support, a rotary cutter journalled on said support, a motor mounted at the rear of said support and a shaft connected to said motor, gearing driven by said shaft for driving said cutter, a guard covering the upper edge of said cutter and paralleling the sides thereof, a front guide having a foot portion adjustably mounted on said support, said guide being adjustable with relation to the cutting edge of said cutter to vary the depth of the cut made thereby, and a rear guide having a portion positioned in the same plane with the cutting edge of the cutter adapted to follow the path of the cutter and to fit in the kerf made thereby.

6. A portable rotary cutting implement comprising a support, a rotary cutter journalled on said support, a motor mounted on said support, shaft and gearing connections between said motor and said cutter, a guide positioned in front of said cutter and having a portion positioned to rest upon the surface to be cut, said guide being adjustable transversely with respect to the axis of said cutter whereby the guide may be employed to vary the depth of the cut, and a second guide positioned at the rear of said cutter having a material engaging edge portion substantially on a line tangent with the circumference of the cutter and positioned in the same plane with said cutter whereby the guide may travel in the kerf formed by the cutter and follow the path thereof.

In testimony whereof I have hereunto set my hand.

EDMOND MICHEL.